May 22, 1934.

G. H. ELLIS 1,959,662

APPARATUS FOR MAKING COMPOSITION BOARDS OR SHEETS

Filed Nov. 11, 1929     8 Sheets-Sheet 7

Inventor
GEORGE HENRY ELLIS

ATTORNEYS

May 22, 1934.　　　　　　G. H. ELLIS　　　　　1,959,662
APPARATUS FOR MAKING COMPOSITION BOARDS OR SHEETS
Filed Nov. 11, 1929　　　8 Sheets-Sheet 8

Inventor
GEORGE HENRY ELLIS

ATTORNEYS

Patented May 22, 1934

1,959,662

UNITED STATES PATENT OFFICE 1,959,662

APPARATUS FOR MAKING COMPOSITION BOARDS OR SHEETS

George Henry Ellis, St. Paul, Minn., assignor to The Insulite Company, Minneapolis, Minn., a corporation of Minnesota Application November 11, 1929, Serial No. 406,303

14 Claims. (Cl. 34—31)

This invention relates to an improved process of and apparatus for making composition boards or sheets adapted for use in the construction of buildings, and for various other purposes.

An object of the invention is to provide an improved process of forming composition boards or sheets from fibrous pulp stock, which consists in subjecting the fibrous pulp stock to pressure of rotating elements to form a web, then subjecting the web to pressure to remove surplus fluid, then severing the web transversely, and subsequently subjecting the severed web portions to a high temperature to dry them.

A further object is to provide an apparatus of the class described including a drier comprising a frame having top, bottom, and side walls secured thereto and cooperating to provide an elongated chamber having a plurality of conveyers therein adapted to receive the composition boards or sheets from a suitable conveyer, commonly known as a "tipple", means being provided within the chamber for heating the air therein to a high temperature so that the boards or sheets, as they pass through the drier, will be thoroughly dried before being discharged therefrom.

A further object is to provide a drier including a frame comprising a plurality of upright columns adapted to support a plurality of horizontal frame members arranged in vertically spaced relation and having a plurality of conveyer rolls mounted thereon in close proximity, and the connections between the horizontal frame members and the columns permitting independent expansion and contraction of the horizontal frame members relatively to the columns, caused by temperature changes in the drier.

Features of the invention reside in the general construction of the drier; in the connections between the horizontal conveyer frame members and the columns of the drier, whereby said members may expand and contract relatively to the columns; in the chain-and-sprocket drive for the rolls of each conveyer within the drier, each of which drives includes a plurality of overlapping alined sprockets arranged to be driven by a single run of a chain; and in the self-alining bearings supporting the conveyer rolls upon the horizontal frame members.

Other objects of the invention will appear from the following description and accompanying drawings and will be pointed out in the annexed claims.

In the accompanying drawings, there has been disclosed a structure designed to carry out the various objects of the invention, but it is to be understood that the invention is not confined to the exact features shown as various changes may be made within the scope of the claims which follow.

General

Figure 1:
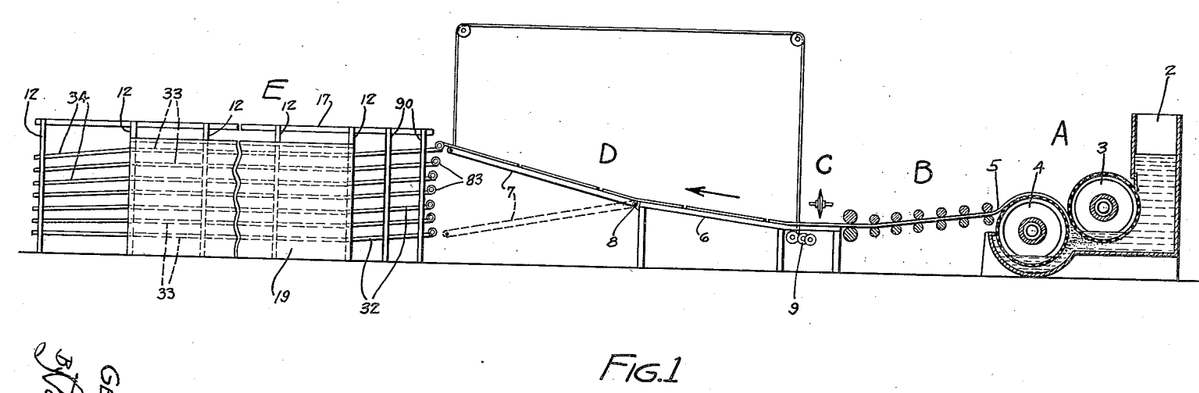
Figure 1 is a view diagrammatically illustrating an apparatus for making composition boards or sheets, including a felting machine, a pressing device, a cutting device, a drier, and means for feeding the material to the drier.

In the selected embodiment of the invention here shown, there is illustrated in Figure 1, an apparatus for carrying out the improved process of making composition boards or sheets as set forth in this invention. This apparatus is shown comprising a suitable felting machine A, a pressing device B, a cutting device C for transversely severing the material, a feeding mechanism D, and a drier E.

The felting machine here shown comprises a suitable tank 2 into which the fibrous pulp stock is delivered from a suitable means, not shown. The pulp is deposited upon the surface of and fed upwardly between the cylinders 3 and 4 and is thereby formed into a web 5 which then passes through the pressing device B to remove surplus liquid or water, after which the web is transversely severed at intervals by means of the cutting device C. The severed web portions are delivered onto a suitable conveyer 6, from which they are fed onto a tipple conveyer 7, pivoted at 8 and provided with suitable means for oscillating it between the full and dotted line positions shown in Figure 1. A means for operating the tipple conveyer 7 is diagrammatically shown at 9 in Figure 1. The tipple conveyer delivers the severed web portions to the drier E through which the severed web portions are slowly fed by suitable conveyers and subjected to a high temperature so that the material will be thoroughly dried when discharged from the opposite end of the drier.

Drier frame

Figures 2, 16, 17:
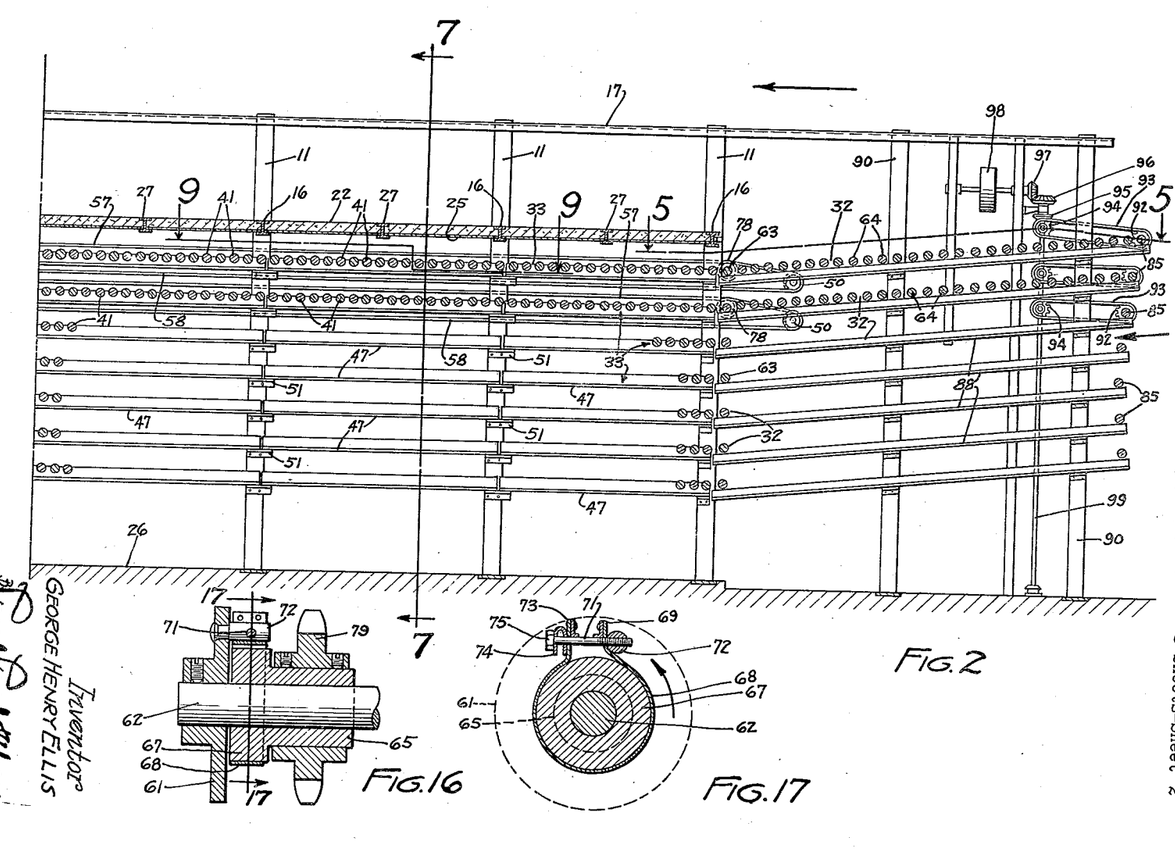
Figure 2 is an enlarged longitudinal sectional view showing the receiving end of the drier.
Figure 16 is a detail sectional view on the line 16—16 of Figure 5.
Figure 17 is a detail sectional view on the line 17—17 of Figure 16.
Figure 3:
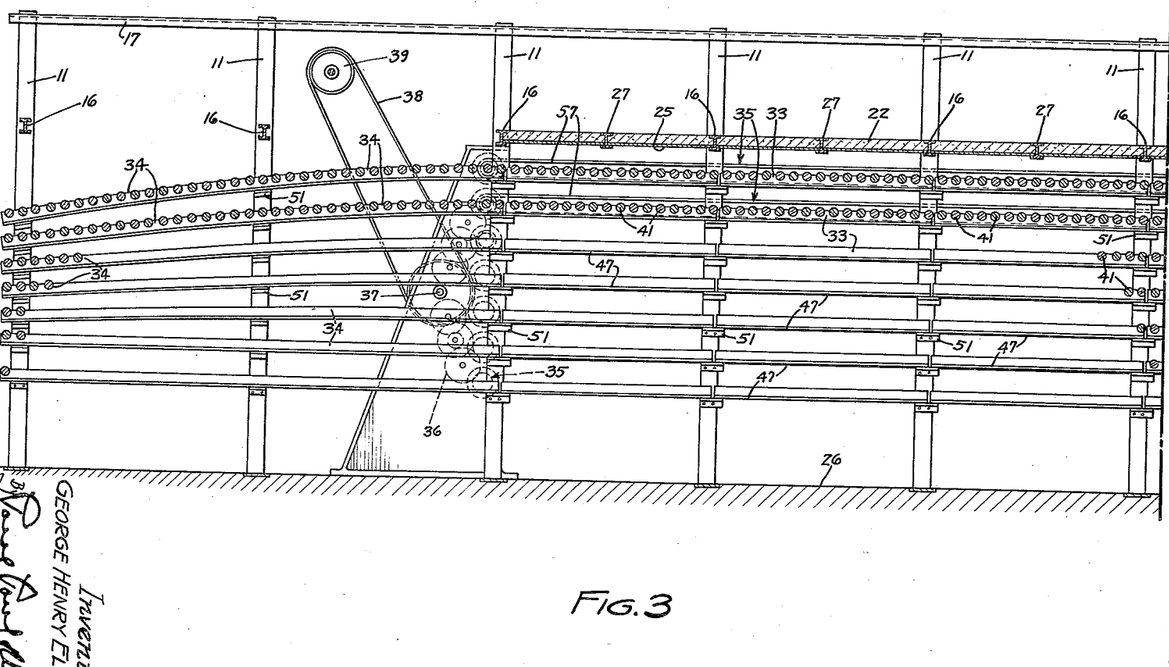
Figure 3 is a longitudinal sectional view showing the discharge end of the drier.
Figures 5, 6:
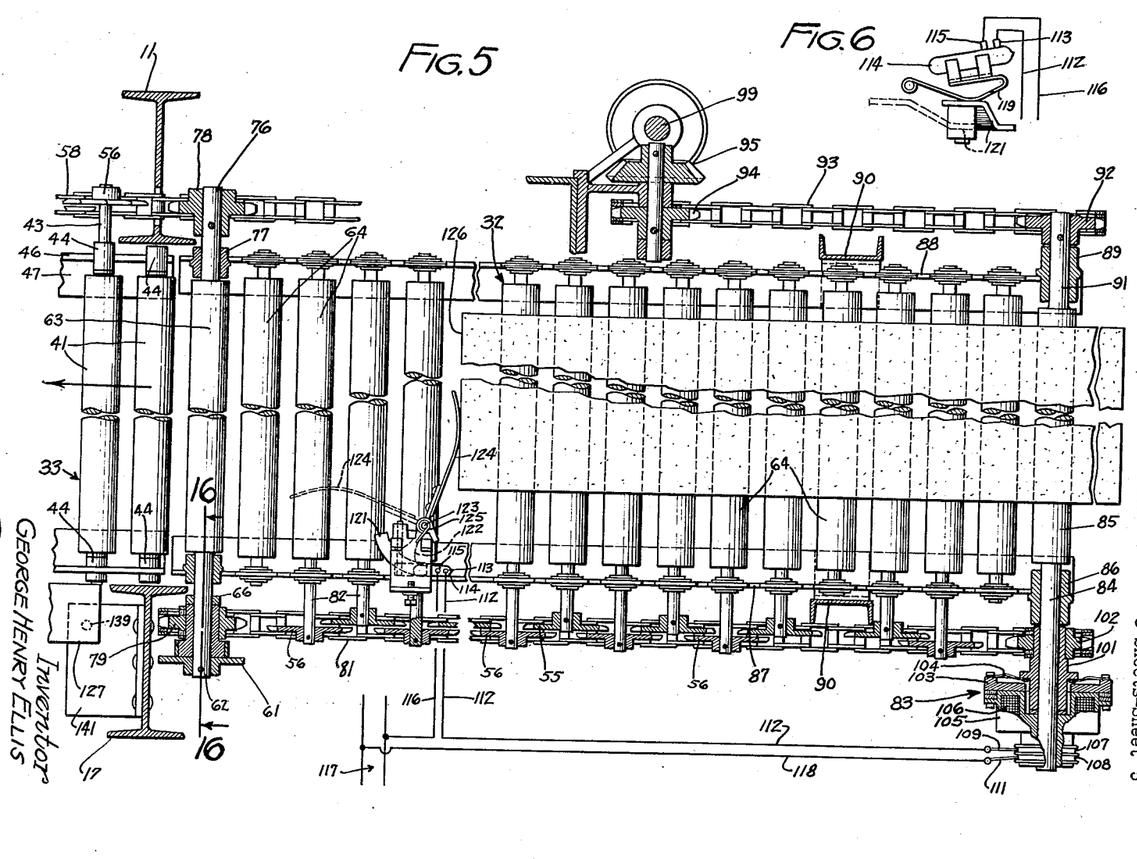
Figure 5 is an enlarged sectional plan view on the line 5—5 of Figure 2, showing a drier feeding means provided with high and low speed drives.
Figure 6 is a detail sectional view showing a means adapted to be actuated by the material passing through the drier to control the operation of the high speed drive.
Figure 7:
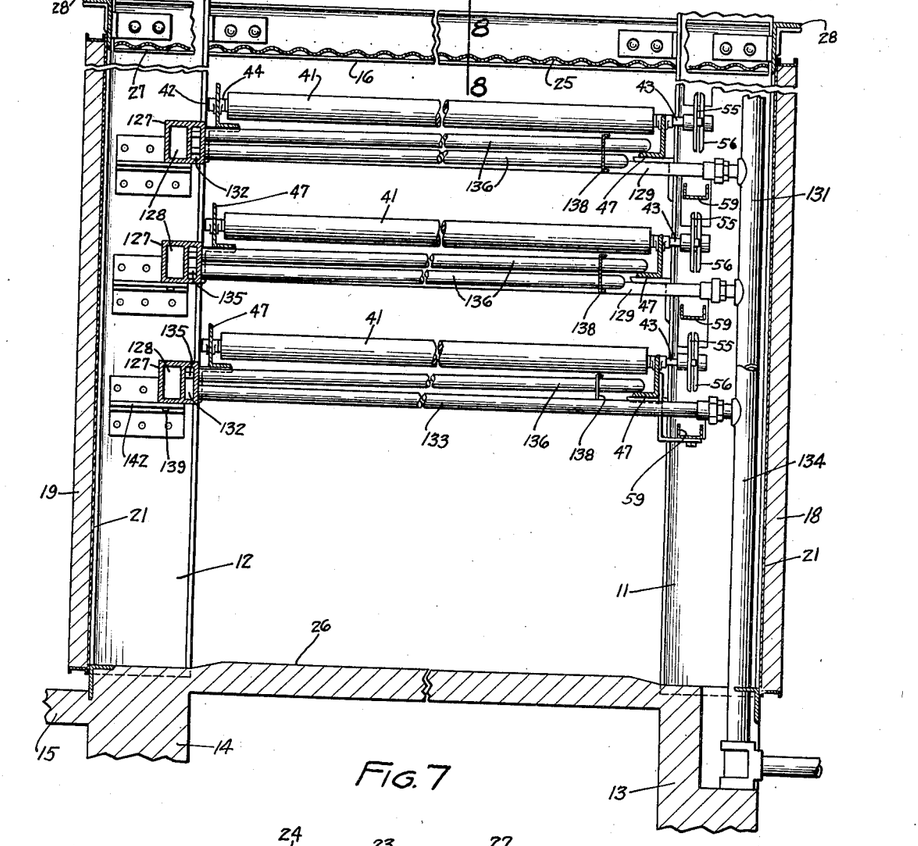
Figure 7 is a cross sectional view on the line 7—7 of Figure 2.

A feature of this invention resides in the construction of the drier through which the material or severed web portions are fed and thoroughly dried. The drier comprises a structural frame including two rows of upright columns 11 and 12, spaced apart lengthwise of the drier as shown in Figures 2 and 3, and spaced apart transversely thereof as shown in Figures 6 and 7. The columns 11 and 12 are mounted upon suitable foundations 13 and 14, respectively, preferably constructed in the floor 15, and are arranged in pairs as shown. Suitable cross members 16 connect together the upper ends of the columns. The extreme upper ends of the columns 11 and 12 are secured together lengthwise of the drier by suitable frame members 17, here shown as channel irons.

Figure 4:
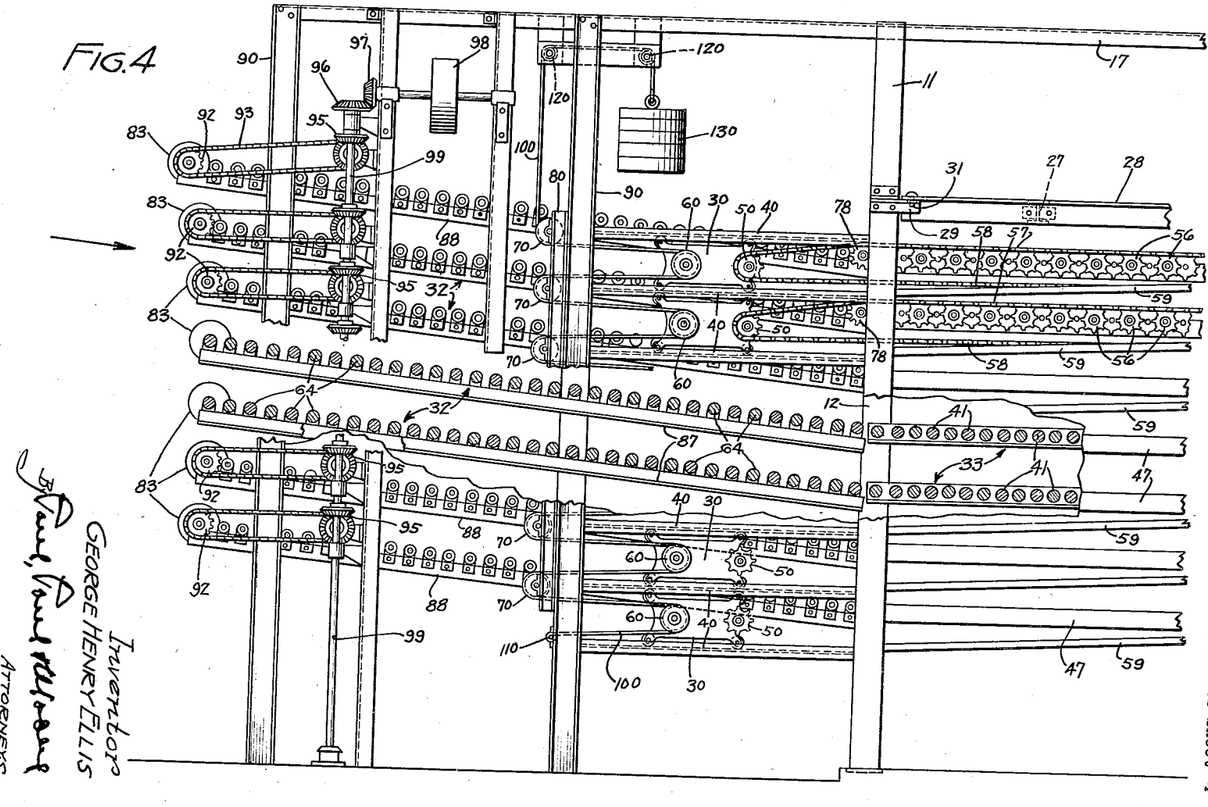
Figure 4 is an elevational view partially broken away, showing a means for feeding the severed web portions to the drier and looking at it from the opposite side of the apparatus from that shown in Figure 2.
Figure 8:
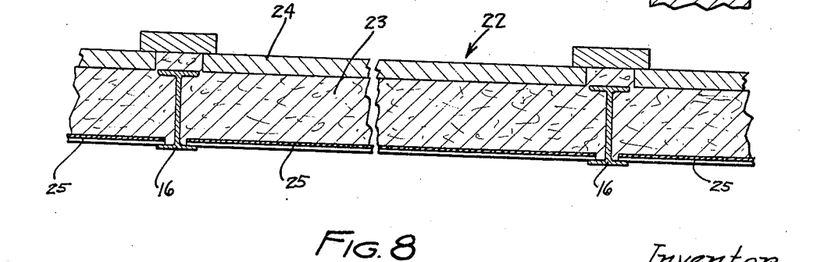
Figure 8 is a detail sectional view on the line 8—8 of Figure 7.
Figure 9:
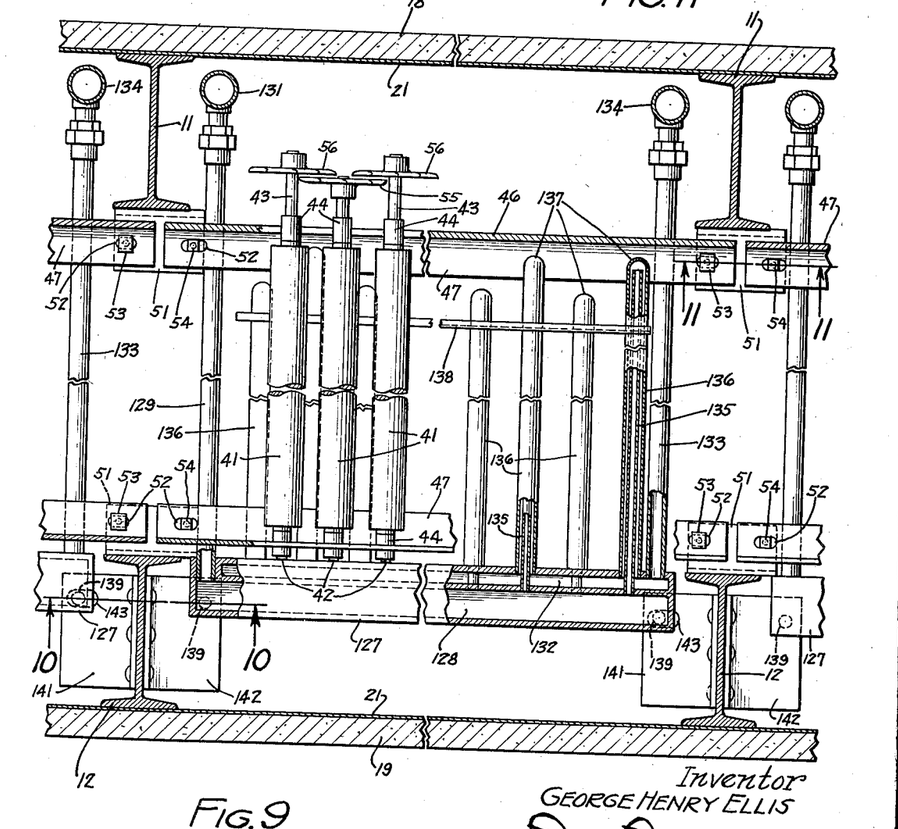
Figure 9 is a sectional plan view on the line 9—9 of Figure 2.

The drier comprises side walls 18 and 19 constructed from a suitable insulating material and supported upon the columns 11 and 12, respectively, as shown in Figure 9. Each wall is provided with a suitable lining 21, preferably of metal. A top wall 22 is supported upon the cross members 16 and is constructed from a suitable insulating material 23 having its upper surface covered over with a suitable material 24 such, for example, as concrete. The top wall 22 is also provided with a suitable metallic lining 25, as shown in Figure 8. It will thus be seen that the side walls 18 and 19, and the top wall 22 cooperate with the bottom wall or floor 26 to define a chamber extending from end to end of the drier. Cross members 27 are interposed between the cross members 16 and are supported upon side frame members 28, preferably of angle iron cross section and having their ends movably supported upon the columns 11 and 12 by means of suitable brackets 29 secured to the columns as shown in Figure 4.

Each bracket 29 is provided with a slot adapted to receive a pin 31 secured to the adjacent end of the frame member 28. By thus movably connecting the frame members 28 with the brackets 31, the members 28 may expand and contract without affecting their connections with the columns. The cross members 27 cooperate with the cross members 16 to support the top wall 22 of the drier.

Drier conveyers

In the drier here shown, seven conveyers are employed, arranged in superposed relation. The feeding conveyers 32 at the receiving end of the drier are each connected with a drier conveyer 33 extending from the conveyers 32 to a plurality of gravity conveyers 34 located at the discharge end of the drier. The conveyers 33 are operated at a constant speed by means of chain-and-sprocket drives 35 operated from a train of gears 36 located adjacent to the discharge end of the drier and operated from a counter shaft 37, having a belt drive 38 with a suitable driving means 39, indicated in Figure 3. The gear drive between the shaft 37 and the conveyers 33 are so arranged that all of the conveyers will operate in the same direction and at the same time and speed.

Figure 14:
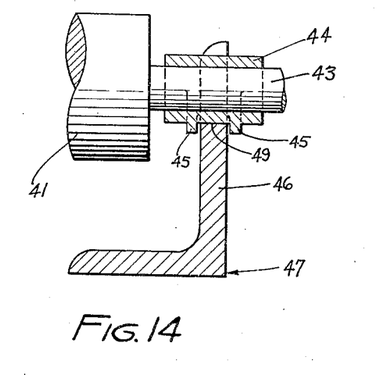
Figure 14 is a detail sectional view on the line 14—14 of Figure 13.
Figure 15:
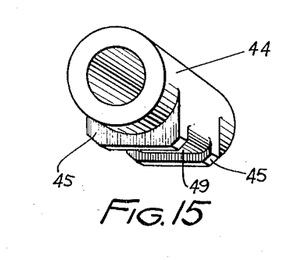
Figure 15 is a perspective view showing one of the self-alining bearings which support the conveyer rolls.

Each conveyor 33 comprises a plurality of rolls 41 each provided with shaft extensions 42 and 43, received in suitable bearings 44, best shown in Figures 14 and 15. Each bearing 44 is provided with a pair of flanges 45 spaced apart to receive the upright web 46 of the longitudinally extending side frame members 47 which support the conveyor roll 41. The upper edges of the flanges 46 of the frame members 47 are provided with rectangular notches 48 adapted to receive the bearings 44, as shown in Figure 14. Each bearing is provided with a squared seat 49 between its flanges 45 to prevent relative rotation of the bearings in the frame members 47 when the rolls 41 are rotated. The spacing between the flanges 45 is also slightly greater than the thickness of the web 46 of the frame member 47 so as to allow each bearing to relatively move in its seat in the web 46, to allow for expansion and contraction of the frame members 47 as a result of the high temperature within the drier chamber.

Supports for horizontal frame members

Figure 11:
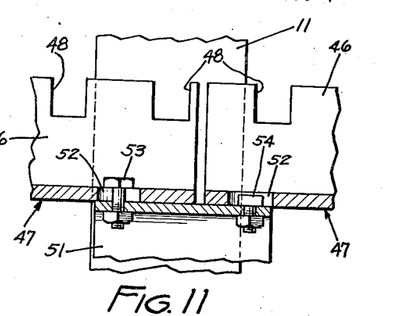
Figure 11 is a detail sectional view on the line 11—11 of Figure 9, showing the movable connections between the horizontal frame members and the upright columns of the drier.

The horizontal frame members 47 have their ends supported upon brackets 51 secured to the columns 11 and 12, as shown in Figure 11. The ends of each frame member 47 are provided with slots 52, one adapted to receive a clamping bolt 53 and the other the head of a bolt 54 secured to the horizontal web portion of the bracket 51. The head of the bolt 54 is slightly smaller than the width of the slot 52 in which it is seated so as to permit relative longitudinal movement of the frame members 47 with respect to the supporting brackets 51. The opposite ends of the side frame members 47 are secured to the brackets 51 by the clamping bolts 53. By thus supporting the horizontal side frame members 47 upon the columns 11 and 12, they may expand and contract without affecting their connections with the columns. The mounting of the bearings 44 upon the upper flanges of the frame members 47 also permits relative movement of the frame members without affecting the operation of the bearings.

Drives for conveyer rolls

Figure 12:
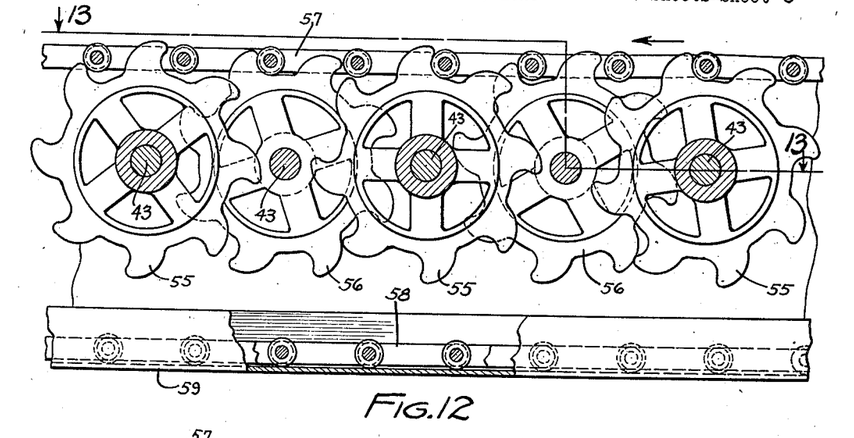
Figure 12 is an enlarged detail sectional view showing the chain-and-sprocket drives for the conveyers in the drier.
Figure 13:
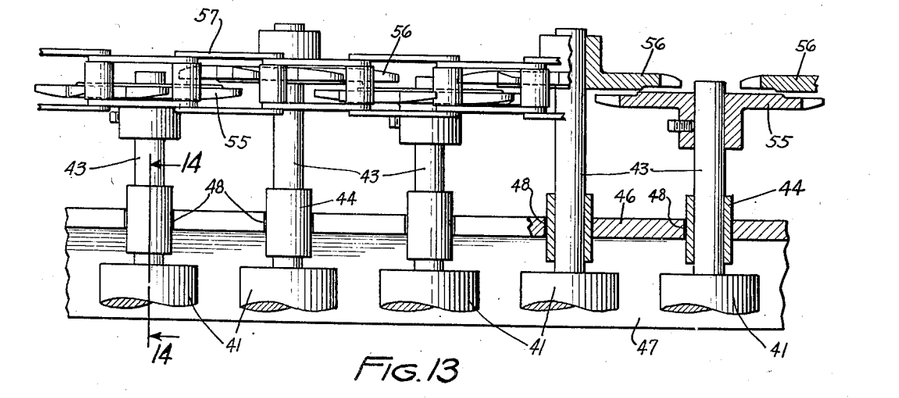
Figure 13 is a sectional plan view on the line 13—13 of Figure 12.

Another feature of the invention resides in the means provided for positively rotating the rolls 41 of the conveyers 33 in the drier, whereby the frictional engagement of the composition boards or sheets with the rolls is minimized. To thus drive the conveyer rolls, a plurality of sprockets 55 and 56 are secured to the shaft extensions 43 of the conveyer rolls 41 as shown in Figure 13. The face width of each sprocket wheel 55 and 56 is substantially equal to half the width of a standard sprocket, and said sprockets are arranged to overlap as shown because of the close spacing between the rolls 41. The sprockets are preferably provided with hook teeth as shown in Figure 12 and are driven by means of a chain 57 of standard width so that one run of the chain may engage and drive all of the sprockets in each conveyer 33. The lower run 58 of each conveyer chain is supported on rails 59 suitably secured to the columns 11 and 12 of the drier frame. By thus driving the sprockets 55 and 56, it will be noted that each roll will be positively driven and that all of the rolls of each conveyer will be rotated at the same speed, thereby imparting very little friction to the composition sheets or boards as they are fed through the drier.

Means are provided for taking up slack in the belts 57—58 and, as shown in Figure 4, each belt is provided with a carriage 30 mounted to travel on rails 40. A sprocket 50 is mounted on each carriage adapted to be engaged by one of the conveyer chains 57—58, and a sheave 60 is mounted at the opposite end of each carriage. Sheaves 70 are shown mounted upon a beam 80 secured to an upright frame member 90. A cable 100 has one end secured to the upright frame member 90, as indicated at 110, and this cable passes backwardly and forwardly around the sheaves 60 and 70 and then over a pair of idlers 120 and has a weight 130 secured to the opposite end thereof, which constantly keeps the cable 100 under tension whereby slack in the chains 57—58 will automatically be taken up.

*Drier feeding conveyers*

To feed the severed web portions from the tipple conveyer 7 to the drier conveyers 33, I prefer to use a plurality of feeding conveyers 32, shown in Figures 2, 4, and 5, and each of which is adapted to be operated at two different speeds by suitable clutches. In the drawings, I have shown a friction clutch for operating each feeding conveyer 32 at low speed, and a suitable magnetic clutch for operating each such conveyer at high speed. The low speed of each feeding conveyer corresponds to that of the drier conveyers 33, and the high speed substantially to that of the high speed of the tipple conveyer 7 which delivers the wet sheets or boards to the feeding conveyers.

The clutch mechanism here shown for operating the feeding conveyers 32 at two different speeds is the invention of Lawrence George Zesbaugh and forms the subject matter of a copending application, filed November 29, 1929, Serial No. 410,517.

The drives for each feeding conveyer, as here shown, are of like construction, and it will therefore be necessary to describe but one such set of drives. The slow speed drive for each conveyer 32 comprises a suitable clutch, preferably of the friction type, having a disk 61 secured to the shaft extension 62 of the roll 63 which is located between the rolls 41 of the drier conveyers 33 and the rolls 64 of the feeding conveyers 32. A collar 65 is rotatably mounted upon the shaft extension 62 and is retained in proper position with respect to the disk 61 by means of a collar 66 secured to the shaft extension. An enlarged cylindrical portion 67 is provided at one end of the collar 65 and is adapted to be engaged by a friction band 68 having its end portion 69 mounted upon a bolt or pin 71 secured to a stud 72 fixedly mounted in the disk 61 by such means as riveting, shown in Figure 16. The opposite end 73 of the band 68 is also engaged with the pin 71 and has a small spring element 74 interposed between it and the head 75 of the bolt 71. This spring constantly exerts a slight pressure against the end portion 73 of the band in a direction towards the stud 72.

The opposite end of the roll 63 has a shaft extension 76 mounted in a suitable bearing 77 and provided with a sprocket 78 driven from one of the chains 57—58 driving the conveyer 33 alined therewith. When the conveyer 33 associated with the conveyer 32 is operating, the roll 63 will be driven from the chain 57—58, which, in turn, will drive the disk 61 in the direction indicated by the arrow in Figure 17, thereby causing the friction band 68 to grip the cylindrical portion 67 and rotate the collar therewith as a unit. A sprocket 79 is secured to the collar 65 and has a drive chain 81 mounted thereon which drives the rolls 64 of the conveyer 32 in a manner similar to that shown and described with reference to Figures 12 and 13. The sprockets secured to the shaft extensions 82 of the rolls 64 are similar to those which drive the rolls 41 of the conveyers 33 and therefore bear like reference numerals.

Each magnetic clutch 83 is mounted upon a shaft extension 84 of the first roll 85 of each feeding conveyer 32. Each shaft extension 84 is supported in a suitable bearing 86 secured to the side frame member 87 which, as shown in Figure 2, is arranged at a slight incline. The corresponding frame member 88 at the opposite side of the conveyer 32 supports a bearing 89 in which the shaft extension 91 of the roll 85 is mounted. The side frame members 87 and 88 of the feeding conveyer are supported upon the columns 11 and 12 located at the receiving end of the drier. A sprocket wheel 92 is shown secured to the shaft extension 91 and is driven by a chain 93 operated from a sprocket 94 which is here shown driven from a pair of mitre gears 95, which, in turn, are driven from a pair of bevel gears 96 and 97 operated from a pulley 98 adapted to be connected with a suitable source of power, not shown. The mitre gears 95 are driven from an upright shaft 99, as shown in Figures 2 and 4.

A sleeve 101 is loosely mounted upon the shaft extension 84 of the roll 85 and has a sprocket 102 secured thereto which is engaged by the drive chain 81, as shown in Figure 5. A disk 103 is yieldably secured to the sleeve 101 by suitable spring elements 104 which permit a slight axial movement of the disk 103 but prevent relative rotation thereof with respect to the sleeve 101. The magnetic clutch, here shown comprises a casing 105 which is secured to the shaft extension 84 and is provided with a suitable winding 106, electrically connected with a pair of suitable collector rings 107 and 108, of ordinary construction. Suitable brushes 109 and 111 engage the collector rings 107 and 108, respectively, as shown. A wire 112 leads from the brush 109 to a contact 113 of a suitable switch 114, here shown as including a mercury tube. (See Figure 6.) The other contact 115 of the switch 114 has a wire 116 connecting it with a suitable supply circuit 117, shown in Figure 5. The brush 111 has a wire 118 connecting it to the supply circuit 117.

The switch 114 is mounted upon a tiltable member 119 adapted to be actuated by a cam 121 having an arm 122 pivoted at 123 as shown in Figure 2. A finger 124 is secured to the arm 122 and has a spring 125 normally holding it in the full line position shown in Figure 5 in the path of the incoming boards or sheets. When the switch finger 124 is in the full line position shown in Figure 5, the circuit leading to the magnetic clutch 83 will be closed, causing the disk 103 to be attracted to the casing 105 as a result of the magnetic influence of the coil 106 which then becomes energized, thereby causing the sleeve 101 to rotate in synchronism with the clutch casing 105 and the shaft 84 to which the clutch casing is secured. When the magnetic clutch 83 is energized, the conveyer rolls 64 of the conveyer 32 will rotate at high speed or at a speed equal to the high speed of the tipple conveyer 7. When the leading end 126 of the sheet or board being fed into the drier engages the switch finger 124 and moves it to the dotted line position shown in Figure 5, the mercury tube of the switch 114 will be tilted to a position to cause the contacts 113 and 115 thereof to become electrically disengaged from one another, whereby the magnetic clutch circuit will be opened, causing the coil 106 to become deenergized, whereupon the disk 104 will become released from the clutch. When the clutch is thus deenergized, the conveyer rolls 64 of the conveyer 32 will be driven at low speed from the friction clutch located at the opposite end of the conveyer. When the conveyer is operated at high speed by the magnetic clutch, the sprocket 79 secured to the sleeve 65 will idle upon the shaft extension 62 of the roll 63, and during this period of operation, the friction clutch will be inoperative. As soon, however, as the magnetic clutch becomes inoperative as a result of opening the supply circuit thereto, the friction clutch will pick up the load and drive the conveyer rolls 64 at low speed.

I prefer to use the clutch mechanisms above described for operating the feeding conveyers 32 at low and high speeds, but I do not confine myself to such use as some other mechanisms equally suitable for the purpose may be employed.

Drier heating means

The means provided for heating the interior of the drier is shown in Figures 7 and 9 and comprises a plurality of steam headers 127 each having an intake chamber 128 communicating with a pipe 129 which in turn is connected with a steam supply pipe 131, shown in Figures 7 and 9. Each header is further provided with a relatively smaller chamber 132 having a pipe 133 connecting it with a pipe 134. A plurality of relatively small tubes 135 are connected with the intake chamber 128 and traverse the chamber 132 and project laterally from the steam header within a plurality of relatively larger pipes 136, each having one end communicating with the steam return chamber 132 in the header. The opposite ends of the pipes 136 are closed as indicated at 137, in Figure 9. A suitable supporting member 138 connects the outer ends of the pipes 136, as shown.

Steam header supporting means

Figure 10:
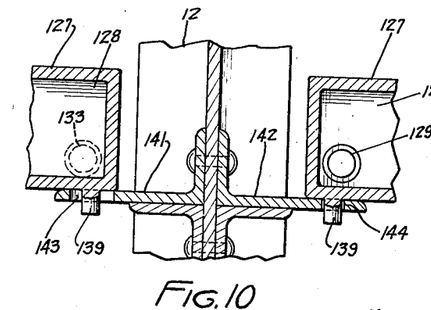
Figure 10 is an enlarged detail sectional view on the line 10—10 of Figure 9 showing the movable connections between the steam headers and the upright columns of the drier frame.

An important feature of the invention resides in the means provided for supporting the headers 127 upon the columns 12 of the drier. Referring to Figures 9 and 10, it will be noted that the headers are shown formed from cast metal and are provided at each end with a depending pin 139, best shown in Figure 10. The ends of the steam headers 127 are supported upon angle brackets 141 and 142, here shown secured to the columns 12. The bracket 141 has an elongated opening or slot 143 adapted to receive the pin 139 of one of the headers, and the bracket 142 has an aperture 144 adapted to receive the pin 139 of another header. By thus supporting the headers upon the brackets 141 and 142, they are permitted to expand and contract as a result of temperature changes in the drier. This will readily be noted by reference to Figures 9 and 10 wherein it will be noted that the pins 139 received in the slots 143 of the brackets 141 may move relatively with respect to the brackets, as the headers 127 expand and contract. The opposite ends of the pipes 137 are supported upon the horizontal webs of the side frame members 47 as shown in Figure 7.

Operation

In the operation of this novel apparatus, the fibrous pulp stock is delivered into the tank 2 from a suitable means not shown. The pulp is then fed upwardly between the cylinders 3 and 4 by the rotary action of the cylinders and rolled into an endless web which passes from the cylinders to the squeezing device "B" where surplus water is removed. As the web is fed towards the drier "E", it is severed transversely at intervals by the cutting device "C". The severed web portions are then delivered to the receiving end of the drier by the tipple conveyer 7 which, as hereinbefore stated, is pivoted at 8 and is operated in timed relation to the feeding of the web portions by the mechanism 9 so as to successively feed the web portions onto the feeding conveyers 32 located at the receiving end of the drier. The conveyers 32 are normally driven at high speed by the magnetic clutch 83 so as to travel at a speed substantially equal to the speed of the tipple conveyer D. As soon as a sheet has been fed from the tipple conveyer onto a feeding conveyer 32, the forward end thereof will engage the switch finger 124 and cause the circuit to the magnetic clutch to be opened, whereupon the speed of that particular conveyer 32 will be reduced to the speed of the aligned drier conveyer 33 upon which the composition sheets or boards are fed through the drier. Each drier conveyer 33 communicates with one of the gravity conveyers 34 located at the discharge end of the drier. The operation of the entire apparatus is substantially automatic.

I claim as my invention:

1. A drying apparatus comprising a plurality of upright columns having walls secured thereto to provide an elongated chamber, conveyers mounted in said chamber and each comprising sectional side rails having conveyer rolls mounted thereon, brackets on said columns for supporting said sectional conveyer rails, means for permitting independent expansion and contraction of said rails relatively to said supporting brackets, sprockets for the conveyer rolls of each conveyer arranged in overlapping relation, a chain for driving the sprockets of each conveyer, and means for driving said chains.

2. A drying apparatus comprising a plurality of upright columns having walls secured thereto to provide an elongated chamber, conveyers mounted in said chamber and each comprising sectional side rails having conveyer rolls mounted thereon, brackets on said columns for supporting said sectional conveyer rails, means for permitting independent expansion and contraction of said rails relatively to said supporting brackets, sprockets for the conveyer rolls of each conveyer arranged in overlapping relation, a chain for driving the sprockets of each conveyer, means for driving said chains, a feeding conveyer for each drier conveyer located at the receiving end of the drier, and means operatively connected with each drier conveyer for driving the feeding conveyers.

3. A drying apparatus comprising a frame having walls secured thereto to provide an elongated chamber, conveyers mounted in said frame and each comprising sectional side rails having conveyer rolls mounted thereon, brackets secured to said frame for supporting said conveyer rails, means for permitting independent expansion and contraction of said rails relatively to said supporting brackets, sprockets for the conveyer rolls of each conveyer arranged in overlapping relation and a chain for driving the sprockets of each conveyer, means for driving said chains, a feeding conveyer for each drier conveyer located at the receiving end of the drier, and means for independently operating said feeding conveyers.

4. A drying apparatus comprising a plurality of supports having walls secured thereto and defining an elongated chamber, a conveyer mounted in said chamber and comprising side rails having a plurality of conveyer rolls mounted thereon, sprockets for the conveyer rolls of said conveyer arranged in overlapping relation, and a chain for driving the sprockets of said conveyer.

5. A drying apparatus comprising a plurality of supports having walls secured thereto and defining an elongated chamber, a conveyer mounted in said chamber and comprising side rails having a plurality of conveyer rolls mounted thereon, and each conveyer roll having a shaft extension at one end, a sprocket on each shaft extension, said sprockets being arranged in overlapping relation, and a run of a chain engaging and driving all of said sprockets.

6. A drying apparatus comprising a plurality of supports having walls secured thereto and defining an elongated chamber, a conveyer mounted in said chamber and comprising side rails having a plurality of conveyer rolls mounted thereon, means for supporting said side rails on said supports, sprockets for the conveyer rolls of said conveyer arranged in overlapping relation, and a single chain engaging the sprockets of said conveyer for driving the conveyer rolls.

7. A drying apparatus comprising a plurality of supports having walls secured thereto and defining an elongated chamber, conveyers mounted in said chamber and each comprising side rails having conveyer rolls mounted thereon, a heating means mounted beneath each conveyer, each of said heating means comprising a header supported upon said supports, means by which said header may expand or contract independently of said supports, and means for simultaneously driving the conveyer rolls of each conveyer.

8. A drying apparatus comprising a plurality of supports having walls secured thereto and defining an elongated chamber, conveyers mounted in said chamber and each comprising sectional side rails having conveyer rolls mounted thereon, a heating means mounted beneath each conveyer, each of said heating means comprising a header supported upon said supports, means by which said header may expand or contract independently of said supports, and means for simultaneously driving the conveyer rolls of each conveyer.

9. A drying apparatus comprising a plurality of supports having walls secured thereto and defining an elongated chamber, conveyers mounted in said chamber and each comprising sectional side rails having conveyer rolls mounted thereon, means for supporting said rails on said supports, means permitting independent expansion or contraction of said rails relatively to said supports, sprockets for the conveyer rolls of each conveyer arranged in staggered relation, a chain for driving the sprockets of each conveyer, a heating means mounted beneath each conveyer and each comprising a header, and means permitting longitudinal expansion or contraction of said header with respect to said supports.

10. A drying apparatus comprising a plurality of supports having walls secured thereto and defining an elongated chamber, conveyers mounted in said chamber and each comprising sectional side rails having conveyer rolls mounted thereon, means for supporting said rolls on said supports, means permitting independent expansion or contraction of said rails relatively to said supports, sprockets for the conveyer rolls of each conveyer arranged in staggered relation, a chain for driving the sprockets of each conveyer, a heating means mounted beneath each conveyer and each comprising a header having a plurality of laterally extending steam circulating pipes or tubes secured thereto, and means permitting longitudinal expansion or contraction of said header with respect to said supports.

11. A drying apparatus comprising a plurality of supports having walls secured thereto and defining an elongated chamber, conveyers mounted in said chamber and each comprising a plurality of anti-friction rolls, means for driving said rolls, a heater mounted beneath each conveyer and comprising a header having longitudinal steam chambers therein, one of which is connected to a steam supply and the other to a return pipe, means on said supports for supporting said header, interconnected steam circulating pipes connecting together said chambers and disposed beneath said conveyer rolls, and means by which said header may expand or contract independently of its supports.

12. A drying apparatus comprising a plurality of supports having walls secured thereto and defining an elongated chamber, conveyers mounted in said chamber and each comprising side rails having a plurality of anti-friction rolls mounted thereon, means for supporting said side rails, means for driving said rolls, a heater mounted beneath each conveyer and comprising a header having elongated steam chambers therein, one of which is connected to a steam supply and the other to a return pipe, means on said supports for supporting said header, interconnected steam circulating pipes connecting together said chambers and disposed beneath said conveyer rolls, means by which said header may expand or contract independently of its supports, and other means permitting expansion and contraction of said side rails independently of their supports.

13. In a drier of the class described, a drier frame, a horizontally extending roller conveyor supported by said frame, a sprocket wheel operatively associated with each roller of said conveyor, and a chain for driving the rollers, each of said sprocket wheels overlapping the sprocket wheels adjacent thereto and being provided with teeth of such width that each sprocket wheel is positively driven by said chain.

14. In a drier of the class described, a drier frame including a plurality of vertically extending frame members spaced longitudinally of the drier at each side thereof, said frame members being in the form of I-beams with their flanges extending longitudinally of the drier and their webs transversely thereof, a horizontally extending roller conveyor supported by said frame, a sprocket wheel arranged upon one end of each roller of the conveyor and of greater diameter than the horizontal distance between centers of adjacent rollers, and a chain for driving said sprocket wheels and said rollers, said sprocket wheels each overlapping the immediately adjacent sprocket wheels and each having teeth of such width that they form with the teeth of the adjacent sprocket wheels teeth slightly less in width than the width of said chain, said frame members on the side of the drier adjacent the sprocket wheels having openings through which said chain passes.

GEORGE HENRY ELLIS.